United States Patent [19]

Policelli

[11] Patent Number: 5,233,737
[45] Date of Patent: Aug. 10, 1993

[54] FILAMENT WOUND THREADED TUBE CONNECTION

[75] Inventor: Frederick J. Policelli, Salt Lake City, Utah

[73] Assignee: Hercules Incorporated, Wilmington, Del.

[21] Appl. No.: 782,954

[22] Filed: Oct. 25, 1991

[51] Int. Cl.$^5$ ............................................. F16L 15/00
[52] U.S. Cl. ..................................... 285/390; 285/423
[58] Field of Search ................ 285/355, 390, 423, 919

[56] References Cited

U.S. PATENT DOCUMENTS

| | | | |
|---|---|---|---|
| 2,751,237 | 6/1956 | Conley | 285/423 X |
| 3,381,715 | 5/1968 | Michael | 285/423 X |
| 3,381,716 | 5/1968 | Michael | 285/423 X |
| 3,388,932 | 6/1968 | Bradley | 285/423 X |
| 3,606,403 | 9/1971 | Medney | 285/423 X |
| 3,765,979 | 10/1973 | Thomas | 285/423 X |
| 3,784,239 | 1/1974 | Carter | 285/423 X |
| 4,275,122 | 6/1981 | Fisher | 285/423 X |
| 4,530,379 | 7/1985 | Policelli | 138/109 |
| 4,537,427 | 8/1985 | Carter | 285/423 X |
| 4,647,078 | 3/1987 | Lundy | 285/149 |
| 4,704,918 | 11/1987 | Orkin | 74/579 |
| 4,813,715 | 3/1989 | Policelli | 285/149 |

*Primary Examiner*—Dave W. Arola
*Attorney, Agent, or Firm*—Robert O'Flynn O'Brien; Mark Goldberg

[57] ABSTRACT

A filament wound pipe for conveying fluids, said pipe having a central longitudinal axis which extends along a length of said pipe which includes at least an end thereof that is for connecting said pipe to another body, said pipe comprising a filament wound axial section, two ramp sections and at least one end section wherein said ramp section is between said axial and said end sections along said central longitudinal axis, and wherein said end section is internally threaded; and wherein said filaments extend from said axial section through said ramp section to a first, to a second and to other locations in one of said end sections and wherein from said ramp section to an end of said end section remote from said ramp section inner dimensions increase along said central longitudinal axis.

18 Claims, 3 Drawing Sheets

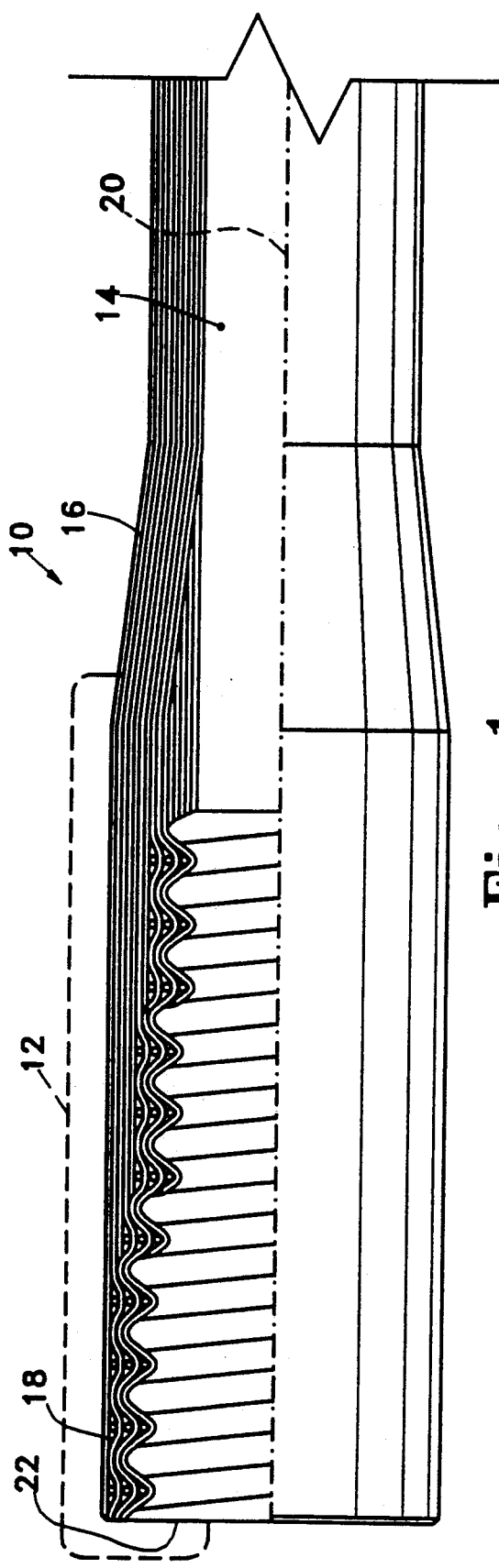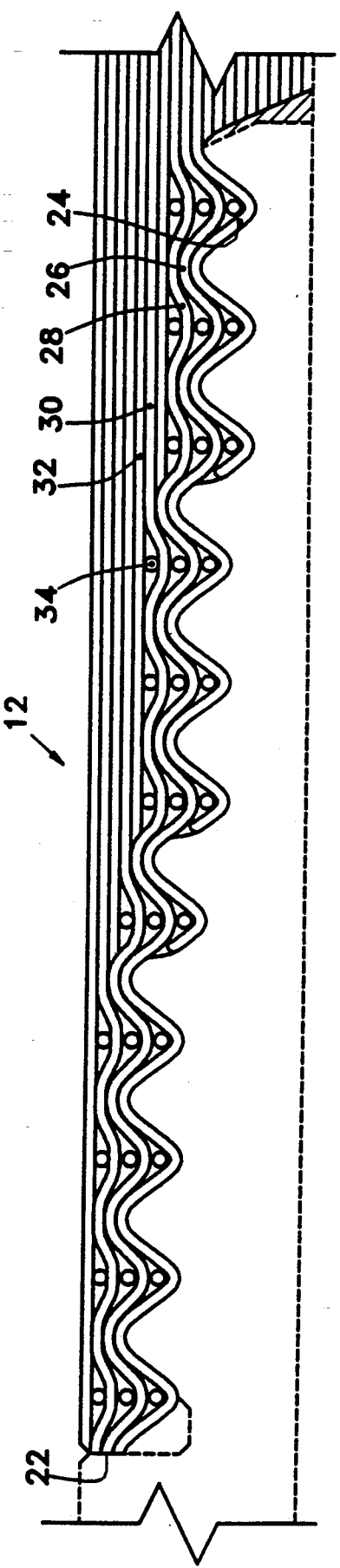

FILAMENT WOUND THREADED TUBE CONNECTION

FIELD OF THE INVENTION

This invention relates to filament wound pipes for pressurized fluid conveyance and, more particularly, to connections between such pipes.

Filament winding is a well known laminating technique for making composite tubes or pipes ("pipe" and "tube" are used interchangeably hereinafter) using high strength filaments such as glass fiber and carbon (graphite) fiber together with thermosettable or thermoplastic resin. Compared to tubes made of metal such as steel, the resultant filament wound tubes are considerably lighter in weight, have equivalent strength and generally have better fatigue resistance. Moreover, the tubes do not corrode. Corrosion resistance requires that the joint connection of pressurized fluid conveyance tubes be constructed without the use of metal-to-metal contact. For this purpose, threads cut directly into the composite tube have been used. This practice has limited the use of composite tubes joined in this manner to low pressure applications owing to the general limitations of interlaminar shear strength of laminated composite filament wound tubes. Cutting of threads into the layers of the laminant exposes interlaminar planes to high shear forces at the root of each thread. Failure under increasing load takes place within this weaker plane before adjacent uncut filamentary layers are loaded to their considerably higher strength level. Cutting holes in the composite tube and joining the tubes with connectors such as rivets or pins is often not advantageous. For example, in oil production tubing, the tube needs to be impermeable to highly pressurized fluids and effective sealing of the holes in the pipe is difficult.

In the prior art of forming threads in composite tubes, all of the helical layers are terminated at the end of the thread zone. This also leads to limited pressure capability since the transfer of load by cross shear from the threaded coupling engages only a very small number of helical layers. The remaining helical layers are loaded by interlaminar shear which has substantially lower strength. The proportion of layers loaded by cross shear is a function of the thread depth and not a function of the tube wall thickness. As an example, only three helical layers of a typical 12 helical layer tube would carry axial load by the stronger cross shear in a typical thread depth of one-tenth inch and therefore have only approximately one fourth the axial strength as in the case of all 12 helical layers carrying axial load by cross shear. Increased thread depth is not desirable since it reduces the coupling bore relative to the outside diameter of the tube.

Therefore this invention provides an improvement over current design and manufacturing procedures for tubular threads which permits use of the highly corrosion resistant composite materials in high pressure applications.

Applications of this design are principally those which require corrosion resistance and must withstand very high pressure fluid flow. Examples include oil production tubing, oil and gas exploration tubing, carbon dioxide surface piping, well fluid injection tubing and geothermal flow lines.

SUMMARY OF THE INVENTION

This invention as illustrated in FIG. 1, involves the use of terminating tubular helical layers along the threaded tube region to allow transfer of thread loads to all axial (helical) layers of the tube directly but only indirectly transferring load through relatively weak interlaminar shear planes between the layers; and incrementally to all threads and without limiting the load introduction to a small number of threads.

The composite pipes of this invention are coupled together through threaded couplings which may be metal or molded plastic having outer dimensions decreasing toward the ends of the couplings. The pipes of this invention may also be connected to other pipes having threaded ends like that of the couplings.

BRIEF DESCRIPTION OF THE FIGURES

FIG. 1 is a schematic depicting pipe 10 broken away in the upper quadrant.

FIG. 2 is an enlargement of the left hand segment of the pipe of FIG. 1 to show the terminating tubular helical layers along the threaded tube region.

FIG. 3 shows the three parts of the mandrel used in the practice of this invention.

FIG. 4 shows the assembled mandrel.

FIG. 5 is a view of the mandrel with the winding of a helical layers.

FIG. 6 shows the winding of a tensioned single strand or tow of fiber following the winding of each helical layer.

FIG. 7 shows the incrementally cut helical layers.

FIG. 8 shows the completion of multi-layer winding.

FIG. 9 illustrates the removal of the mandrel.

FIG. 10 shows the completed threaded tubular joint.

DETAILED DESCRIPTION OF THE INVENTION

Figure 3:
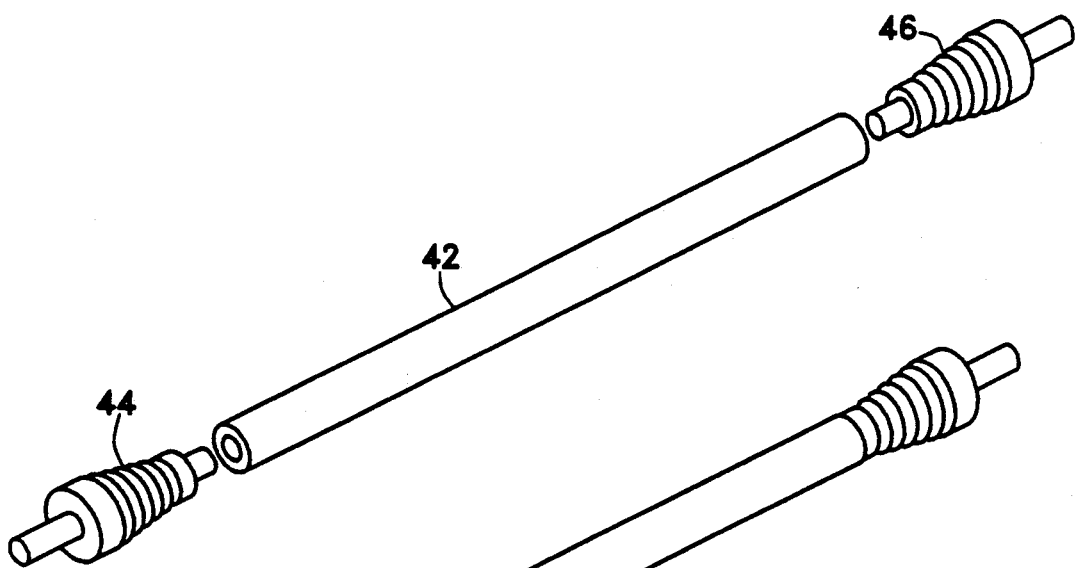
FIGS. 3 to 10 illustrate the manufacturing steps of the filament wound tubes with the connectors of this invention.

Tube 10 of FIG. 1 is made by steps including winding high strength filaments, (e.g., carbon, glass, aramid, or other fiber) around a mandrel. The filaments, which are usually in the form of fiber tow, are coated with a thermoset or thermoplastic resin, preferably an epoxy thermoset, and cured to form the filament wound portions of tube 10.

FIG. I depicts filament wound tube 10 of this invention in partially developed section through its forward quadrant 12 further enlarged in FIG. 2. Tube (or pipe) 10 comprises central body section 14, ramp sections 16, and threaded end sections 18. Ramp sections 16 have inner and outer diameters which increase along central longitudinal axis 20. Threaded end sections 18 have an inner diameter which increases along axis 20 to end 22, thereby facilitating insertion and subsequent threaded engagement with a threaded coupling (not shown) made of metal or molded composite. The coupling may have an insulating non metal (e.g. elastomer or the like) layer around the inside of the coupling.

Threaded end section 18, shown enlarged in FIG. 2, is made by winding tows into layers 24, 26, 28, 30 and 32. As can be seen, these layers extend increasingly into threaded end section 18 with layer 32 and layers above it extending to the end 22 of pipe 10. All layers are formed into the thread shape by a chase strand or tow 34.

The larger diameter of pipe 10 remote from ramp 16 permits easy insertion of the coupling (not shown) for coupling pipe 10 to another pipe or for direct connection to another pipe having a similarly shaped threaded end. Moreover, as can be appreciated, each of layers 24, 26 28, 30 and 32 contact the coupling or other inserted threaded male member on its surface and transfer loads therefrom into the interior of pipe 10 through said layers.

Cylindrical tubes containing the joint connection of the present invention may be fabricated by the filament winding manufacturing process being either the reciprocating or the continuous method. In the reciprocating method each longitudinal layer is completed by laydown of a multiplicity of resin impregnated fiber band circuits during the back and forth motion of the winding carriage. In the continuous method, each longitudinal layer is completed during a single pass usually on a translating mandrel system. Both methods can be used to form the layers of the tube containing the joint construction of this invention. Tubes of any length can be fabricated, but tubes are typically useful with lengths of 30 to 40 feet. Diameters can range from approximately one inch to very large diameters of more than 50 feet. Typical diameters in the practice of this invention are in the range of 3 to 20 inches.

Figure 4:
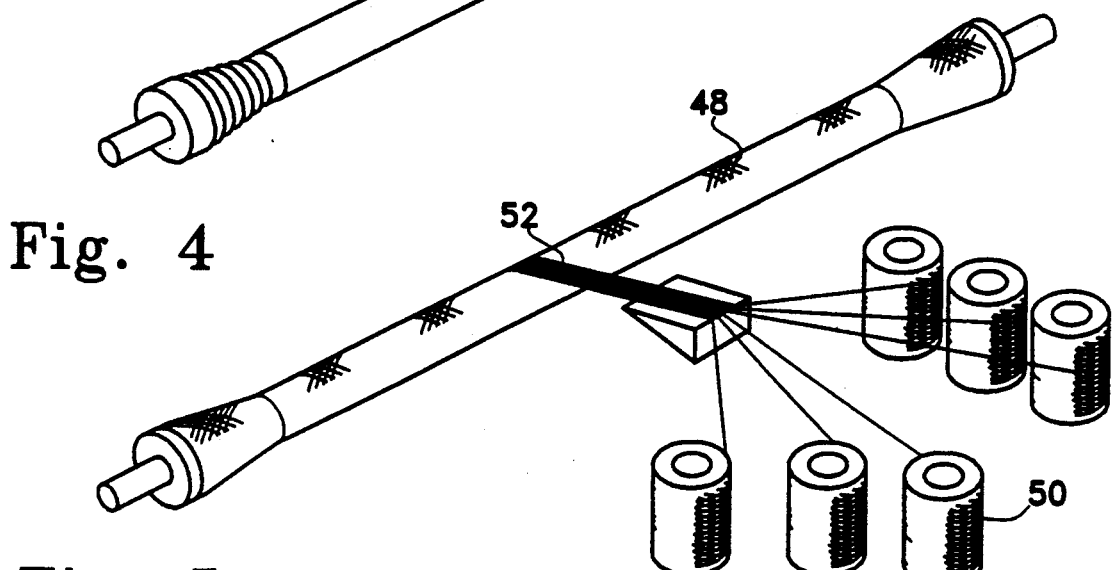

The principal processes of the invention involve the winding and cutting of a multiplicity of helically angled filamentary layers on a mandrel in such a manner as to terminate each of the helical layers at each end of the tube at certain longitudinal positions in the region of the connecting threads. The helical pattern layers of the tube are either of low angles together with high angles or all of a single intermediate angle. A two-angle pattern of layers is generally used for high pressure applications to independently control both axial and circumferentially induced strains occurring under internal pressure loads. A single-angle pattern has special applications such as would be used to maintain a desired zero axial length extension or even an axial length reduction under pressurization. The present invention can be used to form connecting threads for both types of layer patterns. The mandrel is constructed of three sections (FIG. 3) which can be assembled together (FIG. 4) and disassembled during the fabrication process. These sections are: the central body 42 of the mandrel which forms the central bore section of the tube, and two thread forming sections 44 and 46, one for each end of the tube. The thread forming sections contain the inside thread surface dimensions and profiles and are attached to the central mandrel body during winding. After winding and curing, they are detached by being unthreaded from the cured tube thread areas before removal of the central mandrel body.

Figure 5:
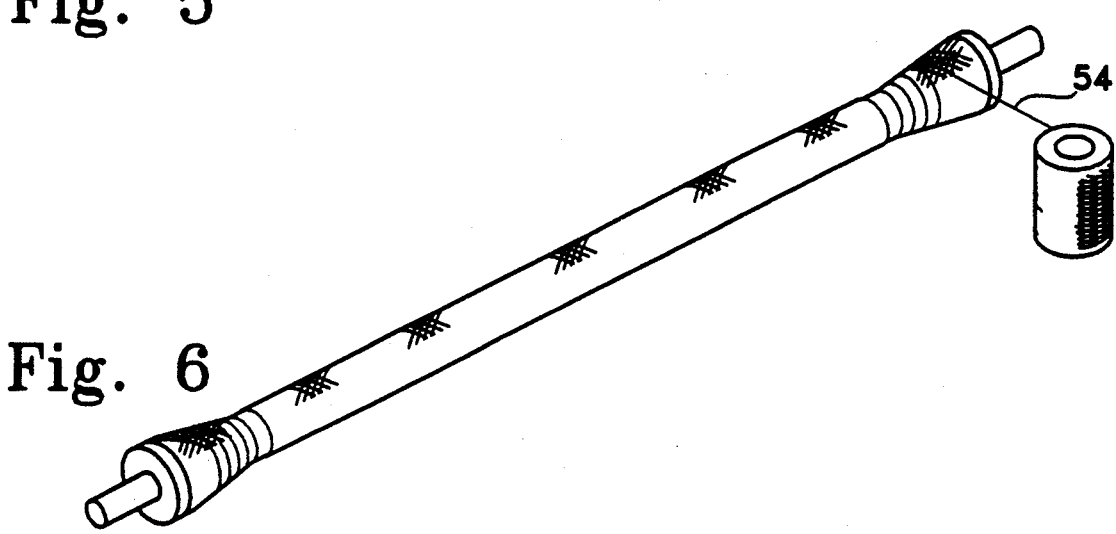
Figure 6:
Figure 7:
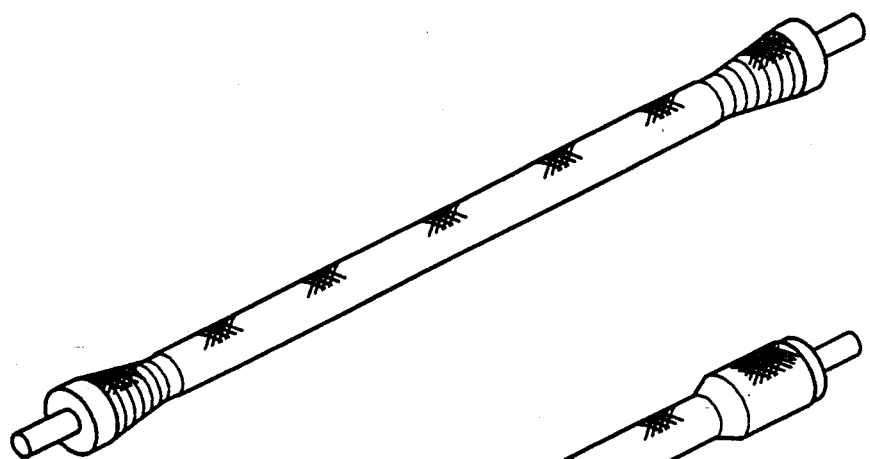
Figure 8:
Figure 9:
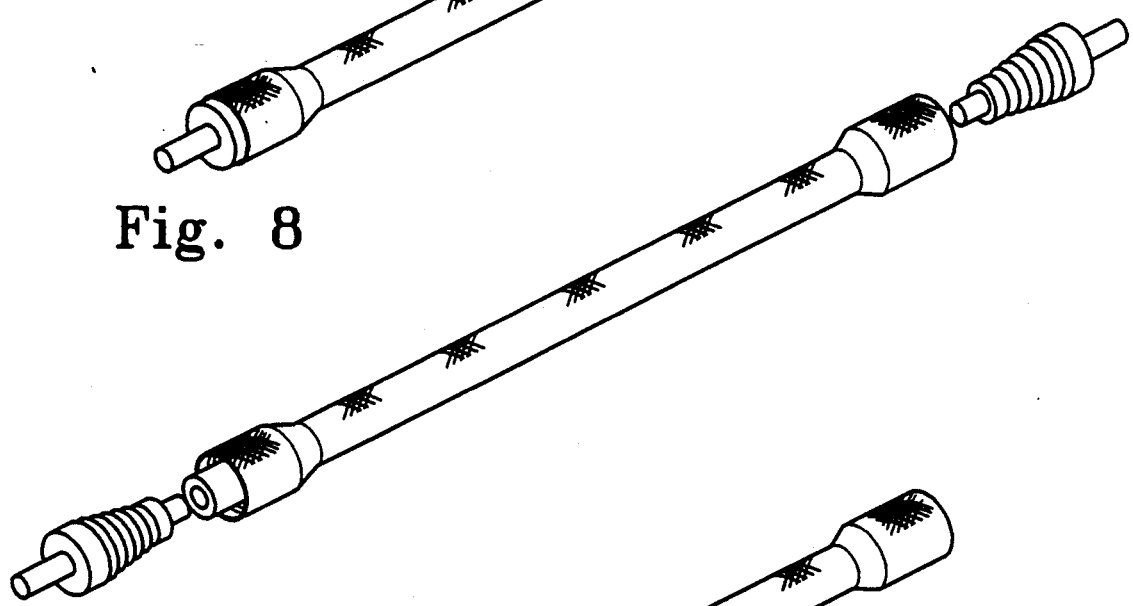
Figure 10:
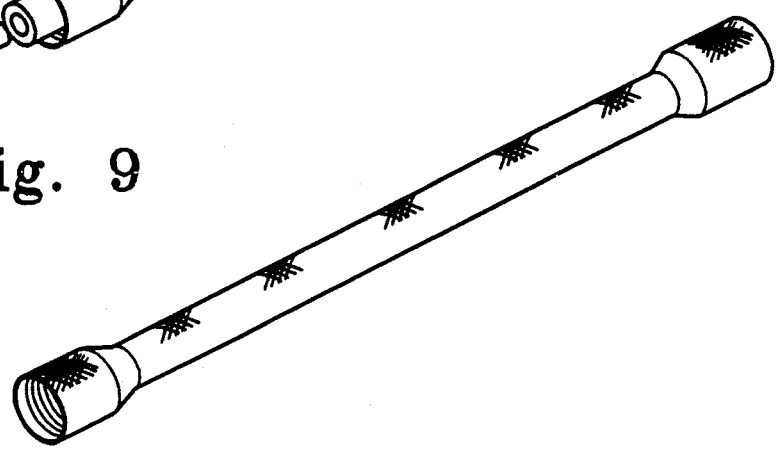

FIG. 5 illustrates the winding of helical layers of fiber tow 48 from a number of spools 50 of fiber tow. In this process, the fiber tows are impregnated with resin and the impregnated fiber tows are collimated into a band 52 which is drawn onto a revolving mandrel. The means of supporting and rotating the mandrel and the traveling carriage which supports the tow delivery mechanism constitute the filament winding machine of a reciprocating type. This machine is not shown in FIGS. 5 through 10, since only the progress of the mandrel and development of the tube joint are shown for clarity in describing the invention. A multiplicity of collimated bands are drawn onto the mandrel in a helical or spiral fashion, half of which have a positive angularity with respect to the mandrel center line and half of which have an equal, but negative angularity. The magnitude of this "helix angle" is determined by the design of the tube in consideration of loads and pressures required of its performance and is controlled during fabrication by the selected mandrel rotational speed and delivery carriage linear speed. After completion of each helical layer a tensioned single strand or tow 54 is partially wound over the helical layer at an angularity and direction equal to the thread pitch as illustrated in FIG. 6. Termination of each helical layer, whether it is for the low angle of a two angle pattern or the single intermediate angle of a single angle pattern, is performed at selected positions within the thread area, by manual cutting of the layer in the case of low quantity production, or automated cutting of the layer for high rates of production. Following cutting of the helical layer, said layer is drawn into the mandrel thread form by the continued winding of the tensioned single strand or tow of fiber resulting in a completed layer of the central body and thread end sections as illustrated by FIG. 7. The process illustrated in FIGS. 5, 6 and 7 is repeated for the laying of each helical layer.

Each helical layer is terminated at a different longitudinal position in order to incrementally bring each successive helical layer into contact with the internal thread surface as best illustrated by FIG. 2. As an example, all twelve helical layers of a typical twelve helical layer tube, when made in accordance with the present invention, are able to carry axial load directly, said load being transferred by cross shear at significantly higher strength. After all layers are completed (FIG. 8), the resin is cured, the part is trimmed, and the mandrel is removed (FIG. 9), resulting in the completed threaded tubular joint section (FIG. 10) of this invention.

I claim:

1. A filament wound pipe for conveying fluids, said pipe having a central longitudinal axis which extends along a length of said pipe which includes at least one end section that is for connecting said pipe to another body, said filament wound pipe comprising an axial section, two ramp sections at least one of said end sections, wherein said ramp section is between said axial and said end sections along said central longitudinal axis, and wherein at least one of said end sections is internally threaded; and wherein said filament wound pipe comprises filaments in helical layers wherein the helical layers are formed into a thread shape and wherein each helical layer formed into a thread shape is terminated incrementally from each other layer within the end sections; and wherein from a position on said ramp section to an end of said end section remote from said ramp section the inner diameter of said pipe increases along said central longitudinal axis.

2. The pipe in accordance with claim 1, wherein said pipe has an inner and an outer side, wherein a portion of said filaments wound around the outer side of said pipe extend continuously between said axial and said end sections and continue to a location at a tip of said pipe remote from said axial section.

3. The pipe in accordance with claim 2, wherein said filaments are selected from the group consisting of glass fiber, carbon fiber and aramid fiber.

4. The pipe in accordance with claim 3 wherein said filaments are in a thermoset or thermoplastic resin matrix.

5. The pipe in accordance with claim 4, wherein said pipe is in combination with a hollow, threaded coupling having outer dimensions decreasing along a longitudinal axis of said coupling toward an end thereof.

6. The pipe in accordance with claim 4, wherein said filaments are in a thermoset resin matrix.

7. The pipe in accordance with claim 6, wherein the thermoset resin matrix comprises an epoxy thermoset.

8. The pipe in accordance with claim 1, wherein said filaments wind around said longitudinal axis at absolute angles with respect to lines drawn parallel to said central longitudinal axis are between 5° and 85°.

9. The pipe in accordance with claim 1, wherein said filaments are in the form of a filament tow.

10. A filament wound pipe for conveying fluids, said pipe having a central longitudinal axis which extends along a length of said pipe which includes at least one end section that is for connecting said pipe to another body, said filament wound pipe comprising an axial section, two ramp sections and at least one of said end sections, wherein said ramp section is between said axial and said end sections along said central longitudinal axis, and wherein at least one of said end sections is internally threaded; and wherein said filament wound pipe comprises filaments in helical layers and a chase strand arranged between the helical layers wherein the helical layers are formed into a thread shape and wherein each helical layer formed into a thread shape is terminated incrementally from each other layer within the end sections; and wherein from a position on said ramp section to an end of said end section remote from said ramp section the inner diameter of said pipe increases along said central longitudinal axis.

11. The pipe in accordance with claim 10, wherein said pipe has an inner and an outer side, wherein a portion of said filaments wound around the outer side of said pipe extend continuously between said axial and said end sections and continue to a location at a tip of said pipe remote from said axial section.

12. The pipe in accordance with claim 11, wherein said filaments are selected from the group consisting of glass fiber, carbon fiber and aramid fiber.

13. The pipe in accordance with claim 12, wherein said filaments are in a thermoset or thermoplastic resin matrix.

14. The pipe in accordance with claim 13, wherein said pipe is in combination with a hollow, threaded coupling having outer dimensions decreasing along a longitudinal axis of said coupling toward an end thereof.

15. The pipe in accordance with claim 13, wherein said filaments are in a thermoset resin matrix.

16. The pipe in accordance with claim 15, wherein the thermoset resin matrix comprises an epoxy thermoset.

17. The pipe in accordance with claim 10, wherein said filaments wind around said longitudinal axis at absolute angles with respect to lines drawn parallel to said central longitudinal axis between 5° and 85°.

18. The pipe in accordance with claim 10, wherein said filaments are in the form of a filament tow.

* * * * *